United States Patent Office 2,999,869
Patented Sept. 12, 1961

2,999,869
ALKALI METAL SALTS OF α,α'-ANTHRA-
QUINONE DISULFONATES
Robert D. Donaldson, Nixon, N.J., assignor to General
Aniline & Film Corporation, New York, N.Y., a corporation of Delaware
No Drawing. Filed Mar. 27, 1958, Ser. No. 724,234
1 Claim. (Cl. 260—370)

The present invention relates to an improved process of preparing alkali metal salts of α,α'-anthraquinone disulfonates containing low amounts of mercury.

It is known that in the sulfonation of anthraquinone by the conventional method in the presence of mercury or its salts the alpha derivatives, i.e., 1,5- and 1,8-disulfonic acids, are formed almost exclusively. The products of sulfonation by this conventional method contain inorganic mercury salts and organically bound mercury. The mercury is exceedingly difficult to remove from either the 1,5- or 1,8-disulfonic acid derivative or salts thereof. In most cases the mercury content may be as high as one percent.

The alkali metal salt of α,α' (1,8)-anthraquinone disulfonate is a valuable intermediate for the preparation of chrysazin (1,8-dihydroxy anthraquinone). Despite the many purification steps resorted to in the manufacture of the intermediate (alkali metal salt of 1,8-anthraquinone disulfonate) and chrysazin therefrom, varying amounts of mercury are found in both compounds. Since chrysazin is also employed for medicinal uses, the National Formulary (1955) has imposed a strict specification requiring that the compound contain not more than 50 p.p.m. of mercury.

It is an object of the present invention to provide an improved process of preparing alkali metal salts of α,α'-anthraquinone disulfonates of very low mercury content which are suitable for preparing chrysazin for medicinal uses.

Other objects and advantages will become more clearly apparent from the following description.

In attaining the foregoing objects, I have found that if finely divided metallic copper is added to the diluted sulfonation liquor (after removal of 1,5-anthraquinone disulfonic acid) at 75° C. and then filtered, the residue on the filter contains metallic copper coated with metallic mercury. The filtrate is diluted with water and the crude alkali metal salt of 1,8-anthraquinone disulfonate precipitated by the addition of an alkali metal halide such as sodium or potassium chloride. The resulting product contains not more than 10 p.p.m. of mercury on the dry basis. With this very low mercury content, the product more than meets the specification of the National Formulary in the production of chrysazin.

The amount of finely divided metallic copper that is added to the sulfonation liquor should be at least 1 part by weight for every 40–45 parts by weight or by volume of the sulfonation liquor. After the copper has been added, the mixture is heated to 70–80° C. with stirring. Thereafter the mixture is slowly diluted with water so that the final mixture is anywhere from 3 to 3.5 times greater than the starting sulfonation liquor either by weight or by volume, preferably by volume. The diluted mixture is again stirred, heated to 70–80° C. for 20–45 minutes, and filtered while hot on an acid proof filter to remove the copper and the mercury, which has plated out on the surface of the copper. A small amount of unreacted anthraquinone is also removed by this filtration. The filtrate is adjusted to 27°–28° Bé. by the addition of water if necessary. To the filtrate is then added 1 part by weight of either sodium or potassium chloride per 19–20 parts by weight or volume of the original sulfonation liquor in one hour at 70–80° C. The resulting mixture is then cooled to 40–60° C., preferably to 55° C., and filtered through an acid proof filter. The filter cake is washed with a sufficient quantity of 1.5% aqueous sodium or potassium chloride solution to remove the residual sulfuric acid and the cake dried at 80–95° C. The quantity of the 1.5% aqueous alkali metal halide is usually in the order of 1 to 1.2 parts by volume per part by weight or by volume of the starting sulfonation liquor.

The following example will show how the improved process of the present invention may be practiced. It is to be understood, however, that this example is merely illustrative and should not be construed as being limitative of the invention disclosed and claimed herein.

*Example*

To 422 parts (by weight) of 4.8% oleum is added 5.4 parts of metallic mercury which is dissolved in the oleum by heating the mixture to 110–120° C. and stirring for 1 hour. The charge is cooled to 60° C. and 355.3 parts of anthraquinone are added slowly over a period of 2 hours. The batch is heated to 85° C. and 436 parts of 65% oleum are added while the temperature rises from the heat of reaction to 110–120° C. The temperature is raised further to 130–132° C. where the batch is held with stirring for 1¾ hours. 204.7 parts of 100% $H_2SO_4$ are then added while allowing the temperature to drop to 100° C. 446.7 parts of 78% $H_2SO_4$ are then added and the batch cooled to 80° C. in 1 hour and held with stirring at 80° C. for 2 hours. The resultant slurry is then filtered to remove the insoluble 1,5-anthraquinone disulfonic acid. The cake is washed with 516 parts of 78% $H_2SO_4$. The mother liquor and acid wash liquors are retained together for the following procedure:

To 427 cc. of the above filtrate liquors there were added 10 grams of finely divided copper metal. The mixture was heated to 75° C. with stirring and diluted slowly with water to a volume of 1342 cc. followed by stirring at 75° C. for 30 minutes and then filtered while hot on an acid proof filter to remove the copper and the mercury which has plated out on the surface of the copper. A small amount of unreacted anthraquinone was also removed by this filtration. The filtrate was adjusted to 27°–28° Bé. by the addition of water. To the filtrate liquor 22.6 grams of potassium chloride were added in one hour at 75° C. The mixture was cooled to 55° C. and filtered on an acid proof filter. The filter cake was washed with 392 cc. of a 1.5% aqueous potassium chloride solution to remove residual sulfuric acid. The product cake was dried at 85–90° C. Yield of product cake was 46.5 grams. Aanalysis of the product gave the following results:

|  | Percent |
| --- | --- |
| Percent dry | 94.7 |
| Percent purity | [1] 82.0 |
| Percent mercury | 0.0008 |

[1] As M.W. 368 on dry basis.

From the foregoing results, it is clearly manifest that substantially all of the mercury was removed from the final product.

I claim:

In the process of preparing alkali metal salts of 1,8-anthraquinone disulfonic acid which comprises disulfonating anthraquinone in the presence of mercury as a catalyst, and separating the 1,5-isomer therefrom to yield a diluted disulfonation liquor containing substantially 1,8-anthraquinone disulfonic acid, the improvement which comprises removing substantially all of the mercury by treating the said disulfonation liquor with finely divided copper metal, heating the treated mixture to 70–80° C., filtering while hot to remove copper and copper-mercury, treating the filtrate with aqueous alkali metal chloride, cooling the treated filtrate and again filtering to isolate the solid salt of 1,8-anthraquinone disulfonic acid followed by drying of the same.

References Cited in the file of this patent

UNITED STATES PATENTS

| | | |
|---|---|---|
| 742,910 | Schmidt | Nov. 3, 1903 |
| 2,207,901 | Somers et al. | July 16, 1940 |

OTHER REFERENCES

Mellor's Modern Inorganic Chemistry, 1939 edition, page 649.